(12) United States Patent
Tang

(10) Patent No.: US 11,005,558 B2
(45) Date of Patent: *May 11, 2021

(54) METHOD FOR DETERMINING FRAME TIMING, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,382

(22) Filed: Sep. 4, 2020

(65) Prior Publication Data

US 2020/0403685 A1 Dec. 24, 2020

Related U.S. Application Data

(63) Continuation of application No. 16/838,958, filed on Apr. 2, 2020, now Pat. No. 10,797,779, which is a (Continued)

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0695* (2013.01); *H04W 48/10* (2013.01); *H04W 48/12* (2013.01)

(58) Field of Classification Search
CPC ..... H04B 7/088; H04B 7/0695; H04W 48/10; H04W 48/12

(Continued)

(56) References Cited

U.S. PATENT DOCUMENTS

| 6,330,459 B1 | 12/2001 | Crichton |
| 2011/0211622 A1 | 9/2011 | Wang |

(Continued)

FOREIGN PATENT DOCUMENTS

| CN | 101026412 A | 8/2007 |
| CN | 101237275 A | 8/2008 |

(Continued)

OTHER PUBLICATIONS

International Search Report in the international application No. PCT/CN2016/088127, dated Mar. 1, 2017.

(Continued)

*Primary Examiner* — Juan A Torres

(74) *Attorney, Agent, or Firm* — Ladas & Parry, LLP

(57) ABSTRACT

A method for determining frame timing, a terminal device and a network device are provided. The method for determining frame timing includes that: a terminal device receives beam-specific information sent by a network device through a beam, here, the beam-specific information includes a sequence number of a time-domain location where a synchronization signal is sent through the beam; the terminal device determines a time-domain offset between the synchronization signal and the frame timing according to a correspondence of a sequence number of the beam, the sequence number of the time-domain location where the synchronization signal is sent and the time-domain offset; and the terminal device determines the frame timing according to the time-domain offset.

14 Claims, 7 Drawing Sheets

Related U.S. Application Data continuation of application No. 16/309,087, filed as application No. PCT/CN2016/088127 on Jul. 1, 2016, now Pat. No. 10,651,921.

(51) Int. Cl.
   *H04W 48/12* (2009.01)
   *H04W 48/10* (2009.01)

(58) Field of Classification Search
   USPC .......................................................... 375/267
   See application file for complete search history.

(56) References Cited

U.S. PATENT DOCUMENTS

| | | |
|---|---|---|
| 2011/0268021 A1 | 11/2011 | Trainin |
| 2012/0307726 A1 | 12/2012 | Pi |
| 2013/0121185 A1 | 5/2013 | Li et al. |
| 2014/0177607 A1 | 6/2014 | Li et al. |
| 2016/0072563 A1 | 3/2016 | Lee et al. |
| 2016/0150435 A1 | 5/2016 | Baek et al. |
| 2016/0308637 A1 | 10/2016 | Frenne et al. |
| 2019/0028222 A1 | 1/2019 | Frenne et al. |
| 2019/0199615 A1 | 6/2019 | Zhang et al. |
| 2019/0223126 A1 | 7/2019 | Liu et al. |
| 2020/0120682 A1 | 4/2020 | Li et al. |

FOREIGN PATENT DOCUMENTS

| | | |
|---|---|---|
| CN | 101296410 A | 10/2008 |
| CN | 101790240 A | 7/2010 |
| CN | 101867953 A | 10/2010 |
| CN | 101877906 A | 11/2010 |
| CN | 101990162 A | 3/2011 |
| CN | 102083226 A | 6/2011 |
| CN | 102857980 A | 1/2013 |
| CN | 103139844 A | 6/2013 |
| CN | 103200684 A | 7/2013 |
| CN | 103220796 A | 7/2013 |
| CN | 104184561 A | 12/2014 |
| CN | 104734760 A | 6/2015 |
| CN | 105376859 A | 3/2016 |
| CN | 105723639 A | 6/2016 |
| EP | 1841092 A1 | 10/2007 |
| EP | 1841092 B1 | 1/2012 |
| JP | 2016506667 A | 3/2016 |
| RU | 2532248 C2 | 11/2014 |
| UA | 99736 C2 | 9/2012 |
| WO | 2015080646 A1 | 6/2015 |
| WO | 2015090067 A1 | 6/2015 |

OTHER PUBLICATIONS

Written Opinion of the International Search Authority in the international application No. PCT/CN2016/088127, dated Mar. 1, 2017.
Supplementary European Search Report in the European application No. 16906820.2, dated Apr. 15, 2019.
First Office Action of the Canadian application No. 3029535, dated Nov. 8, 2019.
Second Office Action of the Canadian application No. 3029535, dated Jul. 21, 2020.
Notice of Allowance of the Russian application No. 2019102385, dated Oct. 25, 2019.
First Office Action of the Japanese application No. 2018-568306, dated Jul. 31, 2020.
First Office Action of the Brazilian application No. 1120180774537, dated Aug. 11, 2020.
First Office Action of the Chinese application No. 201680087187.0, dated Aug. 12, 2019.
Notice of Allowance of the Chinese application No. 201680087187.0, dated Jun. 1, 2020.
Notice of Allowance of the U.S. Appl. No. 16/838,958, dated Jun. 1, 2020.
3GPP, "Rel-10_description", overview of 3GPP Release 10 V.0.08, issued on Sep. 24, 2010, pp. 1-250.
First Office Action of the U.S. Appl. No. 16/309,087, dated Oct. 18, 2019.
Notice of Allowance of the U.S. Appl. No. 16/309,087, dated Dec. 26, 2019.
International Preliminary Report on Patentability issued for International Application No. PCT/CN2016/088127 dated Jan. 1, 2019.
First Office Action of the European application No. 16906820.2, dated Sep. 8, 2020.
Office Action of the Indian application No. 201917002675, dated Sep. 2, 2020.
Supplementary Notice of Allowance of the U.S. Appl. No. 16/838,958, dated Sep. 9, 2020.
First Office Action of the Taiwanese application No. 106121731, dated Nov. 26, 2020.

|  | UE-specific code |
|---|---|
| Terminal 1 | Terminal of beam 1--- ID1 |
| Terminal 2 | Terminal of beam 1--- ID2 |
| Terminal 3 | Terminal of beam 2--- ID1 |
| Terminal 4 | Terminal of beam 3--- ID1 |
| Terminal 5 | Terminal of beam 3--- ID2 |
| Terminal 6 | Terminal of beam 3--- ID3 |
| ... | ... |
| Terminal K-1 | Terminal of beam N--- ID1 |
| Terminal K | Terminal of beam N--- ID2 |

METHOD FOR DETERMINING FRAME TIMING, NETWORK DEVICE, AND TERMINAL DEVICE

CROSS-REFERENCE TO RELATED APPLICATIONS

This application is a continuation application of U.S. application Ser. No. 16/838,958, filed on Apr. 2, 2020, which is a continuation application of U.S. application Ser. No. 16/309,087, filed on Dec. 11, 2018 now U.S. Pat. No. 10,651,921B2, which is a national stage application of International Patent Application No. PCT/CN2016/088127 filed on Jul. 1, 2016, the disclosures of which are incorporated by reference herein in their entities.

BACKGROUND

For extending coverage of the Internet of things, technologies of repetition, power boosting and the like are once adopted in a related art but may act in limited scenarios. A coverage requirement of an Internet of things deployment scenario considered by a 5th-Generation (5G) mobile communication technology keeps increasing and 5G is higher in spectrum and greater in signal loss. Therefore, a possible technical improvement in a 5G system is adoption of a beamformed access technology.

A beamforming technology is also adopted in a 4th-Generation (4G) system but is only adopted for transmission of a User Equipment (UE)-specific data channel. Synchronization, broadcast and control channels and the like are all cell-specific channels and signals and are not suitable to be sent in a beamforming mode.

However, a common channel and signal may be sent in a cell through multiple beams or by beam sweeping, energy of a base station may be concentrated in a certain direction to obtain a forming gain and improve coverage. Therefore, the beamforming technology becomes a novel attractive technology in terms of common channel design of 5G. In spite of this, how to transmit system information of a cell in the cell through a common channel and a control channel by use of the beamformed access technology is still a problem urgent to be solved.

SUMMARY

The disclosure relates to the field of communications, and more particularly to a method for determining frame timing, a network device and a terminal device.

In a first aspect, a method for determining frame timing is provided. The method includes the following operations.

A terminal device receives beam-specific information sent by a network device through a beam. Here, the beam-specific information includes a sequence number of a time-domain location where a synchronization signal is sent through the beam.

The terminal device determines a time-domain offset between the synchronization signal and the frame timing according to a correspondence of a sequence number of the beam, the sequence number of the time-domain location where the synchronization signal is sent and the time-domain offset.

The terminal device determines the frame timing according to the time-domain offset.

In a second aspect, a method for determining frame timing is provided. The method includes the following operations.

A network device determines a time-domain location where a synchronization signal is sent through a beam of multiple of beams.

The network device sends the synchronization signal and beam-specific information to a terminal device. Here, the beam-specific information includes a sequence number of the time-domain location where the synchronization signal is sent through the beam, and the sequence number of the time-domain location is used by the terminal device to determine a time-domain offset between the synchronization signal and the frame timing and determine the frame timing.

In a third aspect, a terminal device is provided. The terminal device includes a processor and a transceiver coupled with the processor.

The processor is configured to: receive, through the transceiver, beam-specific information sent by a network device through a beam, here, the beam-specific information includes a sequence number of a time-domain location where a synchronization signal is sent through the beam; determine a time-domain offset between the synchronization signal and frame timing according to a correspondence of a sequence number of the beam, the sequence number of the time-domain location where the synchronization signal is sent and the time-domain offset; and determine the frame timing according to the time-domain offset.

In a fourth aspect, a network device is provided. The network device includes a processor and a transceiver coupled with the processor.

The processor is configured to determine a time-domain location where a synchronization signal is sent through a beam of multiple of beams; and send, through the transceiver, the synchronization signal and beam-specific information to a terminal device. Here, the beam-specific information includes a sequence number of the time-domain location where the synchronization signal is sent through the beam, and the sequence number of the time-domain location is used by the terminal device to determine a time-domain offset between the synchronization signal and frame timing and determine the frame timing.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, a Universal Mobile Telecommunication System (UMTS) and the like, and are particularly applied to a future 5G system.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario, or the network device may be a relay station, an access point, a vehicle-mounted device, a wearable device, a network device in the future 5G network, a network device in the future evolved PLMN or the like.

Figures 1, 2:
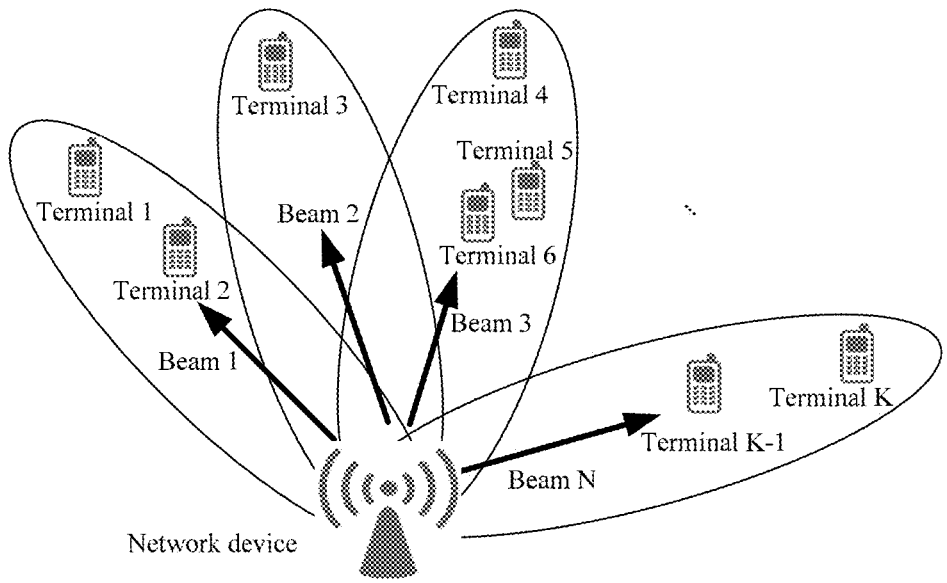
FIG. 1 is a schematic diagram of an application scenario according to an embodiment of the disclosure.
FIG. 2 is a schematic flowchart of a method for signal transmission according to an embodiment of the disclosure.

In the embodiments of the disclosure, FIG. 1 is a schematic diagram of an application scenario according to an embodiment of the disclosure. Specifically, as illustrated in FIG. 1, descriptions will be made herein with any cell of any network device as an example. The cell includes K terminal devices, i.e., a terminal 1 to a terminal K respectively, K is a positive integer. The network device may send downlink signals to the K terminal devices in the same cell through N beams, i.e., a beam 1 to a beam N respectively, N is a positive integer. Moreover, different beams cover different terminal devices. For example, the beam 1 covers the terminal 1 and a terminal 2, a beam 2 covers a terminal 3 and a beam 3 covers a terminal 4 to a terminal 6. Similarly, the K terminal devices communicate with the network device through the corresponding beams. For example, the terminal 1 and the terminal 2 are located in coverage of the beam 1, and then the terminal 1 and the terminal 2 communicate with the network device through the beam 1. Optionally, the N beams may also refer to one or more beams and no terminal devices exist in coverage of the one or more beams.

FIG. 2 is a schematic flowchart of a method 100 for signal transmission according to an embodiment of the disclosure. The method 100 is executed by a network device, for example, a network device in FIG. 1. Specifically, the method 100 includes the following operations.

In S110, the network device generates beam-specific information corresponding to each of multiple beams, here, first beam-specific information of a first beam of the multiple beams is used to indicate a configuration parameter of the first beam and the configuration parameter of the first beam is used for a terminal device in coverage of the first beam to determine system information of the first beam.

In S120, the network device sends corresponding beam-specific information to terminal devices in the same cell through each beam.

Specifically, the network device may send downlink signals to multiple terminal devices in the same cell through the multiple beams, and for each of the multiple beams, the network device generates the beam-specific information of each beam. For example, for the first beam, the network device generates the first beam-specific information of the first beam, and the first beam-specific information is used to indicate the configuration parameter of the first beam. For example, for a beam 3 in FIG. 1, the network device generates the beam-specific information of the beam 3, and the beam-specific information is used to indicate a configuration parameter of the beam 3.

The network device sends, through each beam, beam-specific information corresponding to the beam to the terminal devices in the same cell. For example, the network device may send the first beam-specific information to the terminal device in the first beam through the first beam to enable at least one terminal device in the coverage of the first beam to receive the first beam-specific information and determine the system information of the first beam where the terminal device is located according to the configuration parameter of the first beam in the first beam-specific information.

In such a manner, according to the method for signal transmission of the embodiment of the disclosure, downlink signals are sent to multiple terminal devices in the same cell through the multiple beams, and for the terminal device in each beam, the network device carries a configuration parameter of the beam in the beam-specific information to enable the terminal device in coverage of the beam to acquire system information of the beam according to the configuration parameter of the beam. Therefore, system transmission efficiency may be improved.

It is to be understood that the beam-specific information generated for different beams by the network device may be used to indicate configuration parameters of the corresponding beams. The embodiment of the disclosure will specifically be described below for the condition that the first beam-specific information includes different fields indicating various configuration parameters with the first beam-specific information, generated by the network device, of the first beam as an example.

Optionally, in an embodiment of the disclosure, the first beam-specific information may include a time-domain offset field and the time-domain offset field is used to indicate a time-domain offset between a first synchronization signal sent through the first beam and frame timing of the cell.

It is to be understood that for a conventional 4G system, a location of a synchronization signal in a frame is fixed. For example, a synchronization signal is different for a Frequency Division Duplex (FDD) mode and Time Division Duplexing (TDD) mode of an LTE system, but a time-domain location of the synchronization signal for the same mode is fixed. The terminal device may directly estimate the frame timing by blind detection according to a time-domain location of the synchronization signal.

However, the network device transmits the downlink signals to the terminal devices through the multiple beams and, for different beams, synchronization signals may be sent at different time-domain locations. Therefore, the synchronization signals sent through different beams may have different time-frequency offsets for the frame timing of the cell and timing synchronization may not be implemented in a conventional blind detection manner.

Therefore, in the embodiment of the disclosure, for the first beam of N beams, the time-domain offset between the first synchronization signal sent by the first beam and the frame timing of the cell may be indicated by the time-domain offset field in the first beam-specific information to enable the terminal device in the coverage of the first beam to, after receiving the beam-specific information, determine the time-domain offset between the first synchronization signal sent by the first beam and the frame timing of the cell according to the time-domain offset field in the beam-specific information.

Figure 3:
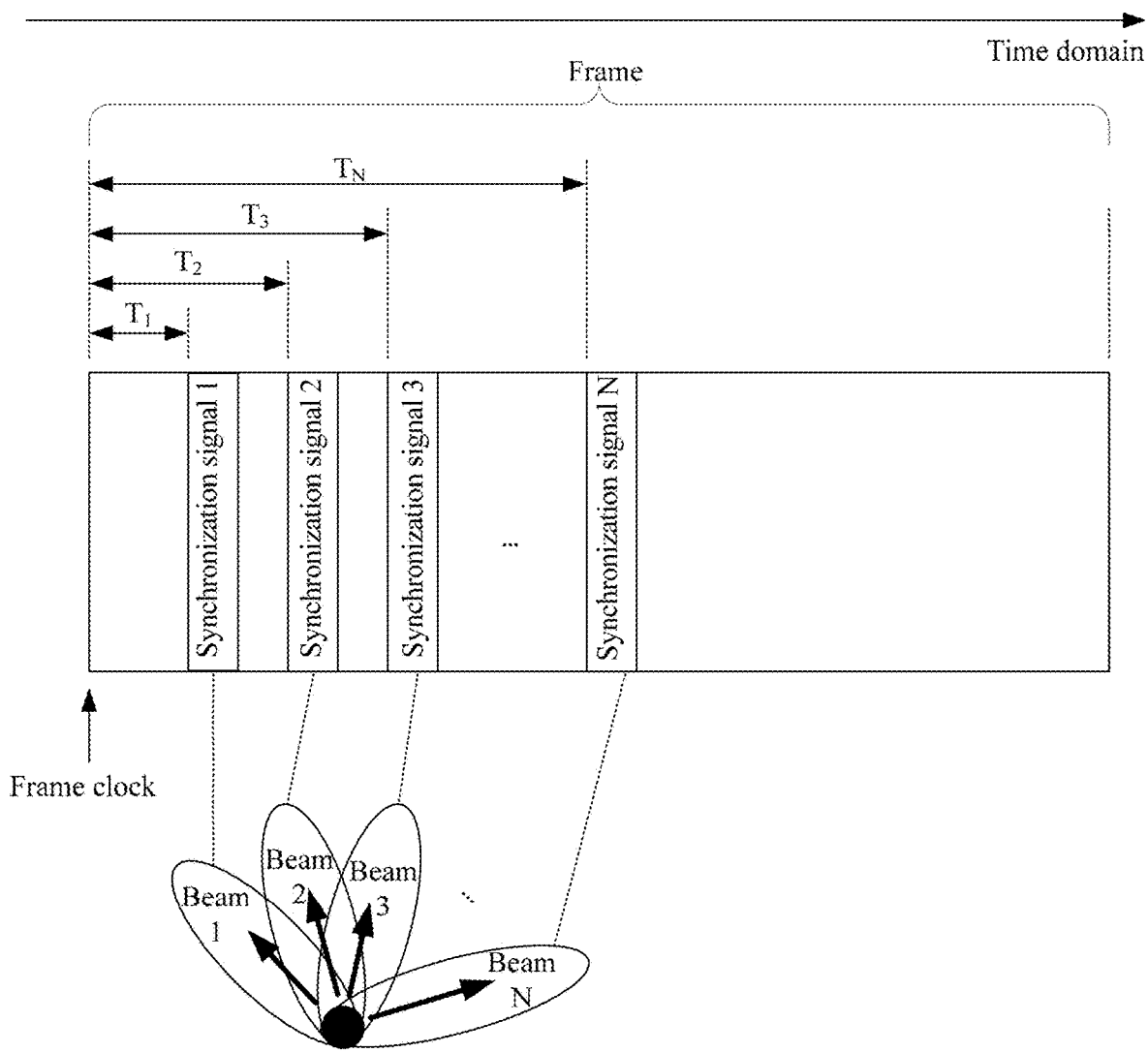
FIG. 3 is a schematic diagram of transmitting a synchronization signal according to an embodiment of the disclosure.

Specifically, as illustrated in FIG. 3, for example, for the same frame, the N beams may send synchronization signals at different time-domain locations. For example, a synchronization signal 1 is sent by a beam 1 at a time-domain location 1, a synchronization signal 2 is sent by a beam 2 at a time-domain location 2 and a synchronization signal N is sent by a beam N at a time-domain location N.

For the first beam, the first beam-specific information of the first beam may include the time-domain offset field and a terminal may determine the time-domain offset of the first synchronization signal sent by the first beam relative to the frame timing of the cell according to the time-domain offset field. For example, for the beam 2, beam-specific information of the beam 2 includes a time-domain offset field and a terminal device receiving the beam-specific information in coverage of the beam 2 may determine according to the time-domain offset field that a time-domain offset of the time-domain location 2 where the synchronization signal 2 is sent by the beam 2 relative to the frame timing of the cell is $T_2$.

Optionally, different beams may also send the synchronization signals in different frames but the time-domain offset of the synchronization signal sent by each beam relative to the frame timing of the cell may be indicated by the time-domain offset field in the respective beam-specific information of the beam.

Optionally, the time-domain offset field may directly indicate the time-domain offset. For example, the time-domain offset field in the beam-specific information of the beam 2 indicates that the time-domain offset is $T_2$.

Optionally, the time-domain offset field may also indirectly indicate the time-domain offset and is represented by a sequence number of the beam or a sequence number of a time-domain location where a synchronization signal is sent by the beam. The time-domain offset is determined according to a corresponding relationship of the sequence number of the beam, the sequence number of the time-domain location where the synchronization signal is sent and the time-domain offset. For example, there are totally K time-domain locations for the N beams to send the synchronization signals. For example, if an nth (n=1, . . . , N) beam sends the synchronization signal at a kth (k=1, . . . , K) time-domain location, a broadcast channel sent by the beam may contain a value of k or a value of n, and the terminal device determines a time-domain offset of the nth beam according to the value of k or the value of n through a mapping relationship between n, k and the time-domain offset.

For example, the time-domain offset field in the beam-specific information of the beam 2 indicates that a sequence number of the beam is 2, and then the terminal device determines according to a corresponding relationship between the sequence number of the beam and the time-domain offset that the time-domain offset corresponding to the beam 2 is $T_2$.

For another example, the time-domain offset field in the beam-specific information of the beam 2 indicates that a location where the synchronization signal is sent by the beam is the time-domain location 2, and then the terminal device may determine according to a corresponding relationship of the time-domain location, the sequence number of the beam and the time-domain offset that the synchronization signal of the beam 2 is received at the time-domain location 2 and the time-domain offset of the synchronization signal is $T_2$.

Therefore, the terminal device in coverage of each beam may determine the time-domain location of the synchronization signal sent by the beam according to the time-domain offset field in the corresponding beam-specific information and further determine the frame timing of the cell.

Optionally, in an embodiment of the disclosure, the first beam-specific information may further include a system bandwidth indication field and the system bandwidth indication field is used to indicate a total bandwidth occupied by a signal sent through the first beam and a frequency-domain offset between a central frequency point of the total bandwidth and a central frequency point of the cell.

It is to be understood that the conventional system only broadcasts a system bandwidth of the whole cell in a broadcast channel and, moreover, in the conventional system, the central frequency point of the cell is uniquely fixed and the central frequency point is directly obtained through a cell search process.

In the embodiment of the disclosure, there may be different numbers of terminal devices in coverage of different beams and bandwidths required to be occupied by different beams may also be set to be different. Therefore, each beam indicates a total bandwidth occupied by the signal sent by the beam and a frequency-domain offset between a central frequency point of the total bandwidth and the central frequency point of the cell through a system bandwidth indication field in its own beam-specific information and the terminal device in the coverage of the beam, after receiving the beam-specific information, determines the total bandwidth occupied by the signal sent by the beam and the frequency-domain offset between the central frequency point of the total bandwidth and the central frequency point of the cell, according to the system bandwidth indication field in the beam-specific information.

Figure 4:
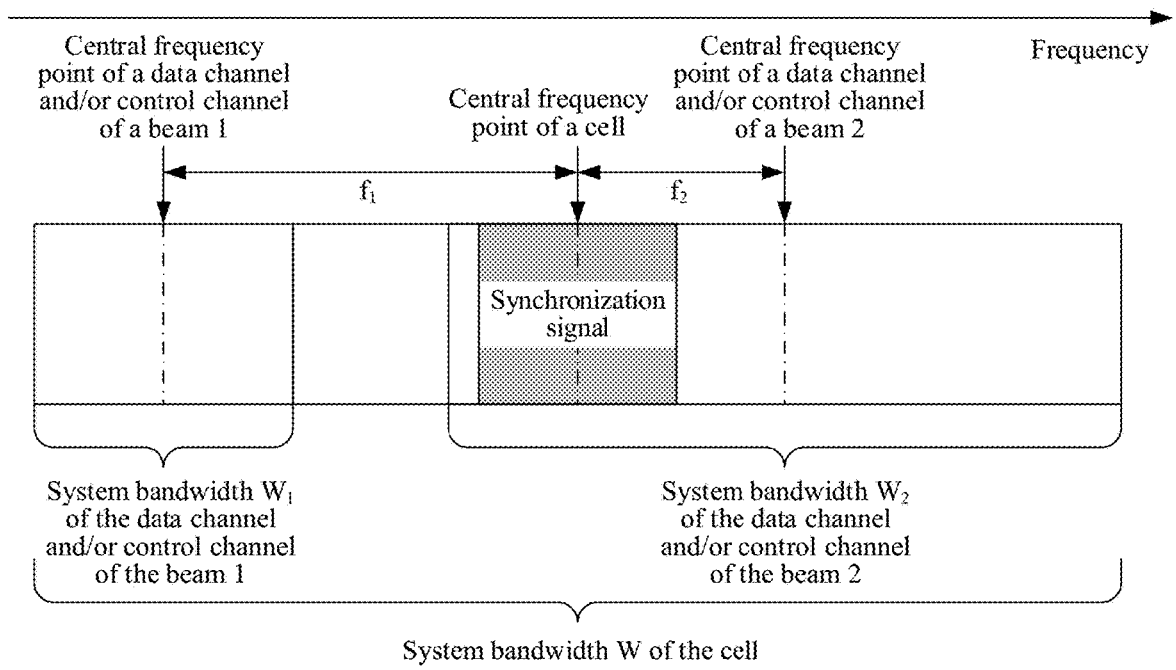
FIG. 4 is a schematic diagram of a beam bandwidth according to an embodiment of the disclosure.

Specifically, as illustrated in FIG. 4, a system bandwidth of the cell is W. For example, for the beam 1 and the beam 2, the beam-specific information of the beam 1 includes a system bandwidth indication field, the system bandwidth indication field is used to indicate a total bandwidth $W_1$ occupied by the signal sent by the beam 1 and a frequency-domain offset $f_1$ of a central frequency point of the total bandwidth relative to the central frequency point of the cell. For example, the total bandwidth may be equal to a bandwidth occupied by a data channel and/or a control channel. Then, the bandwidth occupied by the data channel and/or the control channel is $W_1$ and a frequency-domain offset of a central frequency point of the data channel and/or the control channel relative to the central frequency point of the cell is $f_1$. The beam-specific information of the beam 2 also includes a system bandwidth indication field, here, the system bandwidth indication field is used to indicate a total bandwidth $W_2$ occupied by the signal sent by the beam 2 and a frequency-domain offset $f_2$ of a central frequency point of the total bandwidth relative to the central frequency point of the cell. For example, the total bandwidth may be equal to the bandwidth occupied by the data channel and/or the control channel. Then, the bandwidth occupied by the data channel and/or the control channel is $W_2$ and a frequency-domain offset of a central frequency point of the data channel and/or the control channel relative to the central frequency point of the cell is $f_2$.

It is to be understood that the cell may include multiple beams and frequency-domain locations of bandwidths of each beam may be overlapped.

In such a manner, a total bandwidth occupied by the signal sent by each beam may be set according to the number of devices in the beam, and the total bandwidth and location of the beam are indicated by a system bandwidth indication field in the beam-specific information, so that a beam may only occupy a part of bandwidth to transmit the signal, for example, data and control signaling, and time-frequency resources are saved. Moreover, adjacent beams may occupy different time-frequency resources to transmit the data and the control signaling, so that reduction in interference between the data and control signaling of different beams is facilitated.

Optionally, in an embodiment of the disclosure, the first beam-specific information includes a control channel time-frequency region indication field and the control channel time-frequency region indication field is used to indicate a size of a time-frequency region of a first control channel occupied by control signaling sent to at least one terminal device in the coverage of the first beam through the first beam.

It is to be understood that in the conventional 4G system, the number of symbols occupied by the control channel of the cell may be broadcast, and the control channel of the cell is the same as the bandwidth of the cell in a frequency domain. For example, the number of symbols occupied by a Physical Downlink Control Channel (PDCCH) of the cell is broadcast in a Physical Control Format Indicator Channel (PCFICH), the number of the symbols may be 1, 2 or 3, but there is only one PDCCH with a unified size in the whole cell.

Figure 5:
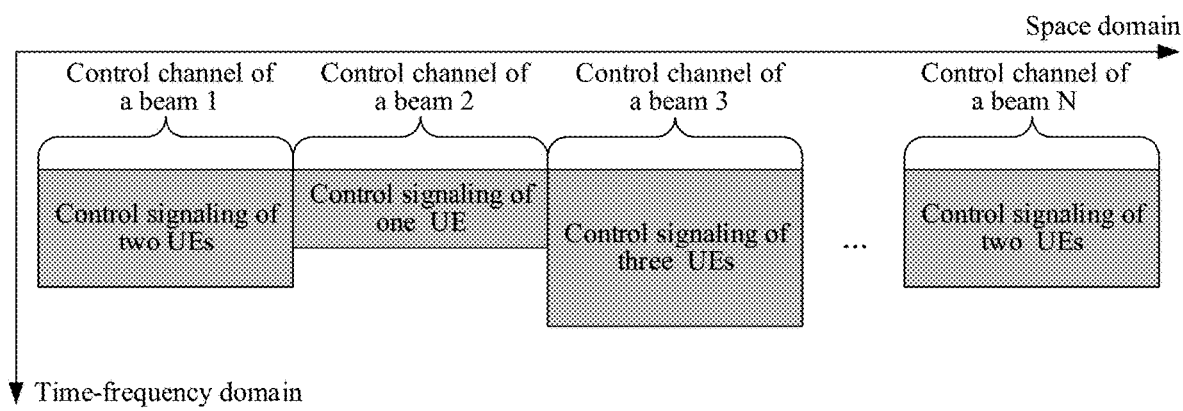
FIG. 5 is a schematic diagram of control channels of different beams according to an embodiment of the disclosure.

In the embodiment of the disclosure, since there may be different numbers of terminal devices in coverage of different beams, control channel capacities required for different beams may also be set to be different. For example, for the N beams in FIG. 1, there is at least one terminal device in coverage of each beam. Therefore, correspondingly, as illustrated in FIG. 5, a size of a control channel of each beam may be set to be different according to different numbers of the terminal devices. The terminal device in the coverage of the beam determines, according to the control channel time-frequency region indication field in the beam-specific information, the size of the time-frequency region of the first control channel occupied by the control signaling sent to the at least one terminal device in the coverage of the first beam through the first beam.

Optionally, different sizes of the control channels of the beams include different time-domain sizes and/or frequency-domain sizes. The embodiment of the disclosure is not limited thereto.

It is to be understood that for different sizes of the control channels in different beams, the beam-specific information of the beam may include the control channel time-frequency region indication field, and the control channel time-frequency region indication field is used to indicate the size of the time-frequency region of the first control channel sent through the first beam.

Optionally, the control channel may be set at a fixed starting location, for example, the control channel is set at a starting location of a frame, and then the size of the time-frequency region is determined according to the time-frequency region indication field.

Optionally, the control channel may be set at an unfixed location, and then the size and location of the time-frequency region of the control channel may be determined according to the time-frequency region indication field.

In such a manner, a size of a time-frequency region of a control channel sent by each beam is indicated by a control channel time-frequency region indication field in the beam-specific information of the beam, and then the beam may be supported to flexibly regulate a capacity of the control channel according to the number of the terminal devices. Therefore, a control channel overhead is saved and a spectrum utilization rate is increased.

Optionally, as an embodiment, the network device may allocate UE-specific codes for the terminal devices in each beam, the UE-specific codes of different terminal devices in each beam are different, but different terminal devices in different beams may have the same UE-specific codes.

It is to be understood that the conventional 4G system allocates UE-specific codes for the terminal devices in the cell in a unified manner and different terminal devices in the cell have different UE-specific codes, for example, a Cell Radio Network Temporary Identifier (C-RNTI) used to receive the PDCCH. Downlink control signaling sent to a certain terminal device is scrambled with a C-RNTI of the terminal, and the terminal device adopts the C-RNTI to perform blind detection on the PDCCH to obtain the control signaling required by the terminal.

However, in a multi-beam beamformed access system, if a cell-specific C-RNTI is still adopted to code a terminal device, a large number of C-RNTIs are required, but a certain terminal device receives control signaling in only one beam. Therefore, UE-specific codes may be allocated for the terminal device in each beam. Since a UE-specific code, for example, a C-RNTI, may be multiplexed between different beams, the number of required C-RNTIs may be greatly reduced, code resources may be saved, a length of a scrambling code may also be reduced and scrambling and descrambling complexity may be reduced.

Figures 6, 7:
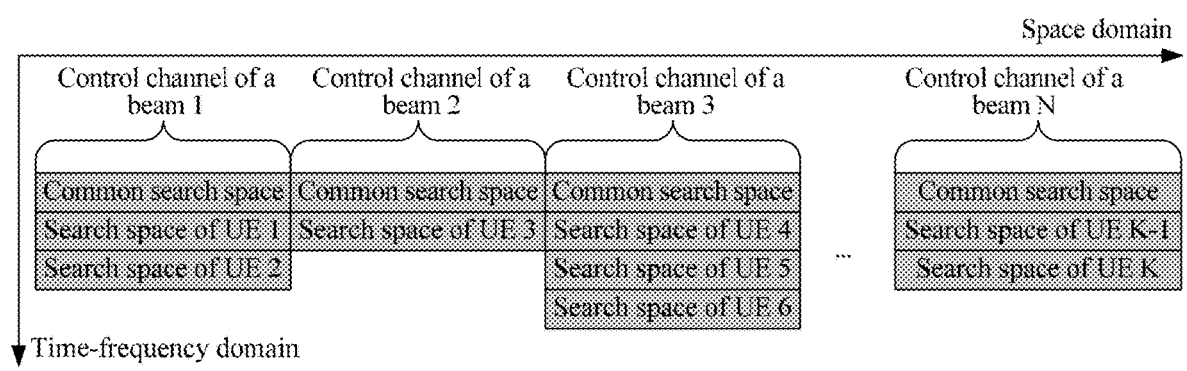
FIG. 6 is a schematic diagram of UE-specific codes allocated for terminal devices according to an embodiment of the disclosure.
FIG. 7 is a schematic diagram of search spaces in control channels of different beams according to an embodiment of the disclosure.

Specifically, for example, the network device illustrated in FIG. 1 sends downlink signals to the K terminal devices through the N beams. For a first beam, different UE-specific codes may be allocated for different terminal devices in the first beam. As illustrated in FIG. 6, different UE-specific codes ID1 and ID2 are allocated for a terminal 1 and terminal 2 in the beam 1 respectively, the UE-specific code ID1 is allocated for the terminal 2 in the beam 2 and different UE-specific codes ID1, ID2 and ID3 are allocated for a terminal 4, terminal 5 and terminal 6 in the beam 3 respectively. For different beams, for example, the beam 1 and the beam 2, different terminal devices, i.e., the terminal 1 and the terminal 3, may have the same UE-specific code ID1. Control signaling in a control channel sent to each terminal device is scrambled according to the UE-specific code allocated for the terminal device to enable each terminal device to, when receiving the control channel sent by the beam, use the UE-specific code of the terminal device to perform blind detection on the control signaling in the control channel of the beam.

It is to be understood that for the first control channel of the first beam, the control channel may include a common search space and a UE-specific search space. The common search space is used to bear common information of the first beam and all terminals in the coverage of the first beam may search this region to acquire the common information. The UE-specific search space is used to bear specific information of each terminal device in the coverage of the first beam and each terminal device may search a search region belonging to the terminal device to acquire the specific information of the terminal device.

It is to be understood that in the conventional 4G system, a PDCCH of a cell also includes a common search space and a UE-specific search space. A terminal device is required to monitor the common search space and is also required to monitor the UE-specific search space allocated for the terminal device, in order to perform blind detection on downlink signaling sent to the terminal device by the network device.

However, for the multi-beam beamformed access system of the disclosure, the search spaces of the control channel are not only uniformly divided for the cell. The search spaces are divided for each beam and the search spaces are divided for different terminal devices covered by different beams. Therefore, sizes of the search spaces may be reduced and blind detection complexity of a terminal may be reduced.

Specifically, for the N beams illustrated in FIG. 1, as illustrated in FIG. 7, each beam includes a common search space and a UE-specific search space. For example, the control channel of the beam 1 includes a common search space, and a UE-specific search space of the terminal 1 and the terminal 2. For the common search space, the terminal 1 and terminal 2 in the coverage of the beam 1 may search through a common code and acquire common information of the common search space. The UE-specific search space includes a search space of the terminal 1 and a search space of the terminal 2, the terminal 1 searches the UE-specific search space of the terminal 1 according to the UE-specific code ID1 to acquire specific information of the terminal 1, and similarly, the terminal 2 searches the UE-specific search space of the terminal 2 according to the UE-specific code ID2 to acquire specific information of the terminal 2.

It is to be understood that a location of a UE-specific search space divided for a terminal device in a PDCCH of a cell in the conventional 4G system is determined by a C-RNTI allocated for the terminal by the cell and the number of Control Channel Elements (CCEs) in the PDCCH.

However, in the embodiment of the disclosure, sizes of control channels of different beams are different. Therefore, for the first control channel of the first beam, a location of a UE-specific search space of the first terminal device may be determined according to a size of the first control channel and the UE-specific code of the first terminal device. A location of the common search space in the first control channel may also be determined according to the size of the first control channel and a common code.

It is to be understood that in the related art, since a size of a CCE is fixed, a size and location of a UE-specific search space may be determined according to the location of the UE-specific search space allocated for the terminal device.

Optionally, for the embodiment of the disclosure, a resource unit with the same size may be set like the CCE, the location of the UE-specific search space is determined according to the UE-specific code and the size of the control channel, and the size of the UE-specific search space may also be determined.

Optionally, for the embodiment of the disclosure, the resource unit with the fixed size may also not be set, and the location and size of the UE-specific search space are determined according to the UE-specific code and the size of the control channel.

In such a manner, according to the method for signal transmission of the embodiment of the disclosure, the network device sends the downlink signals to the multiple terminal devices in the same cell through the multiple cells, and for the terminal device in each beam, the network device contains the configuration parameter of the beam in the beam-specific information sent to the terminal device, to enable the terminal device in the coverage of the beam to acquire the system information of the beam according to the configuration parameter of the beam. Therefore, the situation in the related art that a beam may send unified cell-specific information is avoided, so that different beams may send different information, the configuration parameter of each beam may be independently configured, thus system flexibility is improved, and system transmission efficiency may also be improved.

The method for signal transmission of the embodiments of the disclosure is described above from a network device side, and a method for signal transmission of the embodiments of the disclosure will be described below from a terminal device side.

Figure 8:
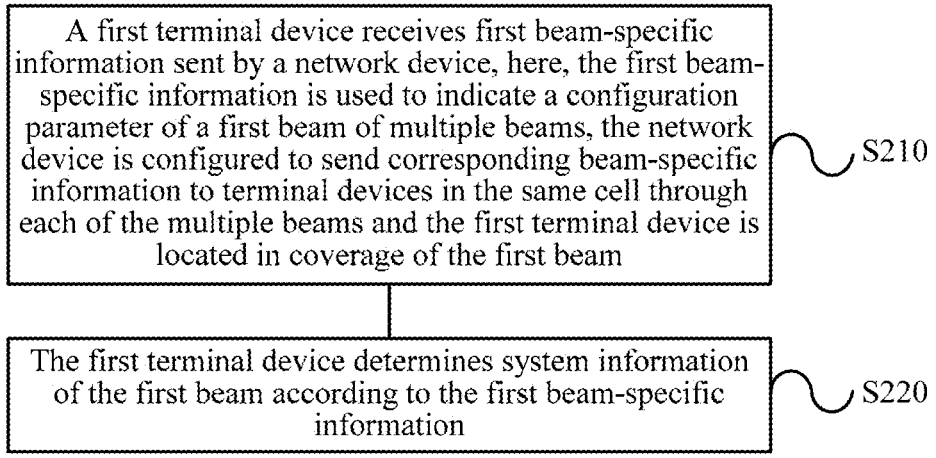
FIG. 8 is a schematic flowchart of a method for signal transmission according to an embodiment of the disclosure.

FIG. 8 is a schematic flowchart of a method 200 for signal transmission according to an embodiment of the disclosure. The method 200 is executed by a terminal device, for example, any one of K terminal devices in FIG. 1. As illustrated in FIG. 8, the method 800 includes the following operations.

In S210, a first terminal device receives first beam-specific information sent by a network device, here, the first beam-specific information is used to indicate a configuration parameter of a first beam of multiple beams, the network device is configured to send corresponding beam-specific information to terminal devices in the same cell through each of the multiple beams and the first terminal device is located in coverage of the first beam.

In S220, the first terminal device determines system information of the first beam according to the first beam-specific information.

In such a manner, according to the method for signal transmission of the embodiment of the disclosure, the network device sends downlink signals to multiple terminal devices in the same cell through the multiple beams, and the terminal device in each beam may acquire system information of the beam according to a configuration parameter of the beam in the beam-specific information received from the network device. Adoption of different configurations for different beams may be supported. Therefore, beam transmission flexibility is improved, system transmission efficiency is improved and resource waste is avoided.

Optionally, the first beam-specific information includes a time-domain offset field, and the operation that the first terminal device determines the system information of the first beam according to the first beam-specific information includes that: the first terminal device determines, according to the time-domain offset field, a time-domain offset between a first synchronization signal received through the first beam and frame timing of the cell.

Optionally, the first beam-specific information includes a system bandwidth indication field, and the operation that the first terminal device determines the system information of the first beam according to the first beam-specific information includes that: the first terminal device determines, according to the system bandwidth indication field, a total bandwidth occupied by a signal received through the first beam and a frequency-domain offset between a central frequency point of the total bandwidth and a central frequency point of the cell.

Optionally, the first beam-specific information includes a control channel time-frequency region indication field, and the operation that the first terminal device determines the system information of the first beam according to the first beam-specific information includes that: the first terminal device determines, according to the control channel time-frequency region indication field, a size of a time-frequency region of a first control channel received through the first beam.

Optionally, the first control channel includes a common search space and a UE-specific search space, and the method further includes that: the first terminal device determines common information of the first beam according to the common search space; and the first terminal device determines specific information of the first terminal device according to the UE-specific search space.

Optionally, different terminal devices in the coverage of the first beam have different UE-specific codes, the first terminal device corresponds to a first UE-specific code, and the method further includes that: the first terminal device descrambles first control signaling corresponding to the first terminal device in the first control channel according to the first UE-specific code.

Optionally, the method further includes that: the first terminal device determines a location and size of a UE-specific search space corresponding to the first terminal device in the first control channel according to a size of the first control channel and the first UE-specific code.

It is to be understood that in the embodiment of the disclosure, interaction between the network device and the terminal device and related properties, functions and the like described from the network device side correspond to those described from the terminal device side and will not be elaborated herein for simplicity.

In such a manner, according to the method for signal transmission of the embodiment of the disclosure, the network device sends the downlink signals to the multiple terminal devices in the same cell through the multiple cells, and the terminal device in each beam receives the configuration parameter of the beam in the beam-specific information sent by the network device, and acquires the system information of the beam according to the configuration parameter of the beam. Therefore, the situation in the related art that a beam may only send unified cell-specific information is avoided, so that different beams may send different information, the configuration parameter of each beam may be independently configured, thus system flexibility is improved, and system transmission efficiency may also be improved.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

The methods for signal transmission according to the embodiments of the disclosure are described above in detail. A network device and terminal device according to the embodiments of the disclosure will be described below. It is to be understood that the network device and terminal device of the embodiments of the disclosure may execute various methods in the abovementioned embodiments of the disclosure. That is, the following specific working process of each device may refer to the corresponding process in the method embodiments.

Figure 9:
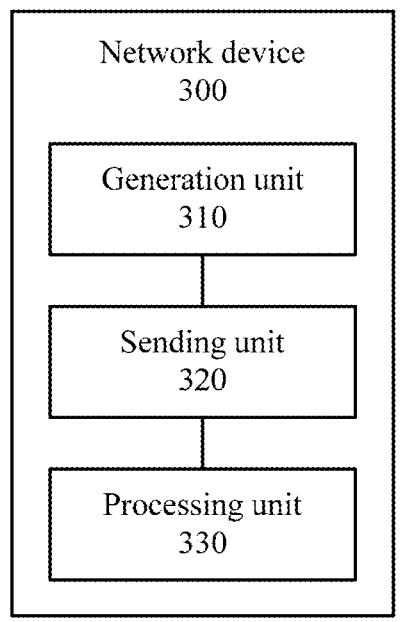
FIG. 9 is a schematic block diagram of a network device according to an embodiment of the disclosure.

FIG. 9 is a schematic block diagram of a network device 300 according to an embodiment of the disclosure. As illustrated in FIG. 9, the network device 300 includes a generation unit 310 and a sending unit 320.

The generation unit 310 is configured to generate beam-specific information corresponding to each of multiple beams, here, first beam-specific information of a first beam of the multiple beams is used to indicate a configuration parameter of the first beam and the configuration parameter of the first beam is used for a terminal device in coverage of the first beam to determine system information of the first beam.

The sending unit 320 is configured to send corresponding beam-specific information to terminal devices in the same cell through each beam.

In such a manner, according to the network device of the embodiment of the disclosure, downlink signals are sent to multiple terminal devices in the same cell through the multiple beams, and for the terminal device in each beam, the network device contains a configuration parameter of the beam in the beam-specific information to enable the terminal device in coverage of the beam to acquire system information of the beam according to the configuration parameter of the beam. Adoption of different configurations for different beams may be supported. Therefore, beam transmission flexibility is improved, and system transmission efficiency is improved.

Optionally, the first beam-specific information includes a time-domain offset field and the time-domain offset field is used to indicate a time-domain offset between a first synchronization signal sent through the first beam and frame timing of the cell.

Optionally, the first beam-specific information includes a system bandwidth indication field and the system bandwidth indication field is used to indicate a total bandwidth occupied by the signal sent through the first beam and a frequency-domain offset between a central frequency point of the total bandwidth and a central frequency point of the cell.

Optionally, the first beam-specific information includes a control channel time-frequency region indication field and the control channel time-frequency region indication field is used to indicate a size of a time-frequency region of a first control channel sent to at least one terminal device through the first beam.

Optionally, the first control channel includes a common search space and a UE-specific search space, the common search space is used to bear common information of the first beam, the UE-specific search space is used to bear specific information of each of at least one terminal device in the coverage of the first beam and each terminal device communicates with the network device through the first beam.

Optionally, the network device further includes a processing unit 330, configured to allocate different UE-specific codes for different terminal devices of the at least one terminal device, here, a first terminal device of the at least one terminal device corresponds to a first UE-specific code. The processing unit 330 is further configured to scramble first control signaling corresponding to the first terminal device in the first control channel according to the first UE-specific code.

Optionally, the processing unit 330 is further configured to determine, by the network device, a location and size of a UE-specific search space corresponding to the first terminal device in the first control channel according to a size of the first control channel and the first UE-specific code.

It is to be understood that the network device 300 according to the embodiment of the disclosure may correspondingly execute the method 100 in the embodiment of the disclosure and the abovementioned and other operations and/or functions of each module in the network device 300 are adopted to implement the corresponding flows of each method in FIG. 1 to FIG. 7 respectively and will not be elaborated herein for simplicity.

In such a manner, according to the network device of the embodiment of the disclosure, the network device sends the downlink signals to the multiple terminal devices in the same cell through the multiple cells, and for the terminal device in each beam, the network device contains the configuration parameter of the beam in the beam-specific information sent to the terminal device, to enable the terminal device in the coverage of the beam to acquire the system information of the beam according to the configuration parameter of the beam. Therefore, the situation in the related art that a beam may only send unified cell-specific information is avoided, different beams may send different information, the configuration parameter of each beam may be independently configured, thus system flexibility is improved, and system transmission efficiency may also be improved.

Figure 10:
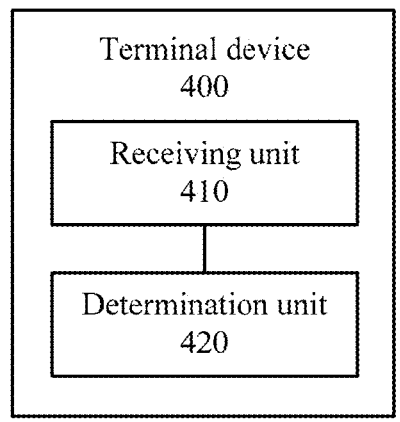
FIG. 10 is a schematic block diagram of a terminal device according to an embodiment of the disclosure.

As illustrated in FIG. 10, a terminal device 400 according to the embodiment of the disclosure includes a receiving unit 410 and a determination unit 420.

The receiving unit 410 is configured to receive first beam-specific information sent by a network device, here, the first beam-specific information is used to indicate a configuration parameter of a first beam of multiple beams, the network device is configured to send corresponding beam-specific information to terminal devices in the same cell through each of the multiple beams and the terminal device is located in coverage of the first beam.

The determination module 420 is configured to determine system information of the first beam according to the first beam-specific information.

In such a manner, according to the embodiment of the disclosure, the terminal device may acquire the system information of the corresponding beam according to the configuration parameter of the beam in the beam-specific information received from the network device, and the network device may send downlink signals to multiple terminal devices in the same cell through multiple beams. Adoption of different configurations for different beams may be supported. Therefore, beam transmission flexibility is improved, system transmission efficiency is improved and resource waste is avoided.

Optionally, the first beam-specific information includes a time-domain offset field, and the determination unit 420 is specifically configured to determine, according to the time-domain offset field, a time-domain offset between a first synchronization signal received through the first beam and frame timing of the cell.

Optionally, the first beam-specific information includes a system bandwidth indication field, and the determination unit 420 is specifically configured to determine, according to the system bandwidth indication field, a total bandwidth occupied by a signal received through the first beam and a frequency-domain offset between a central frequency point of the total bandwidth and a central frequency point of the cell.

Optionally, the first beam-specific information includes a control channel time-frequency region indication field, and the determination unit 420 is specifically configured to determine, according to the control channel time-frequency region indication field, a size of a time-frequency region of a first control channel received through the first beam.

Optionally, the first control channel includes a common search space and a UE-specific search space, and the determination unit 420 is specifically configured to determine common information of the first beam according to the common search space and determine specific information of the terminal device according to the UE-specific search space.

Optionally, different terminal devices in the coverage of the first beam have different UE-specific codes, the terminal device corresponds to a first UE-specific code, and the determination unit 420 is specifically configured to descramble first control signaling corresponding to the terminal device in the first control channel according to the first UE-specific code.

Optionally, the determination unit 420 is specifically configured to determine a location and size of a UE-specific search space corresponding to the terminal device in the first control channel according to a size of the first control channel and the first UE-specific code.

It is to be understood that the terminal device 400 according to the embodiment of the disclosure may correspondingly execute the method 200 in the embodiment of the disclosure and the abovementioned and other operations and/or functions of each module in the terminal device 400 are adopted to implement the corresponding flows of each method in FIG. 8 respectively and will not be elaborated herein for simplicity.

In such a manner, according to the embodiment of the disclosure, the terminal device receives the beam-specific information sent by the network device, the network device may send the downlink signals to the multiple terminal devices in the same cell through the multiple cells, and the terminal device acquires the system information of the corresponding beam according to the configuration parameter of the beam in the beam-specific information. Therefore, the situation in the related art that a beam may send unified cell-specific information is avoided, different beams may send different information, the configuration parameter of each beam may be independently configured, thus system flexibility is improved, and system transmission efficiency may also be improved.

Figure 11:
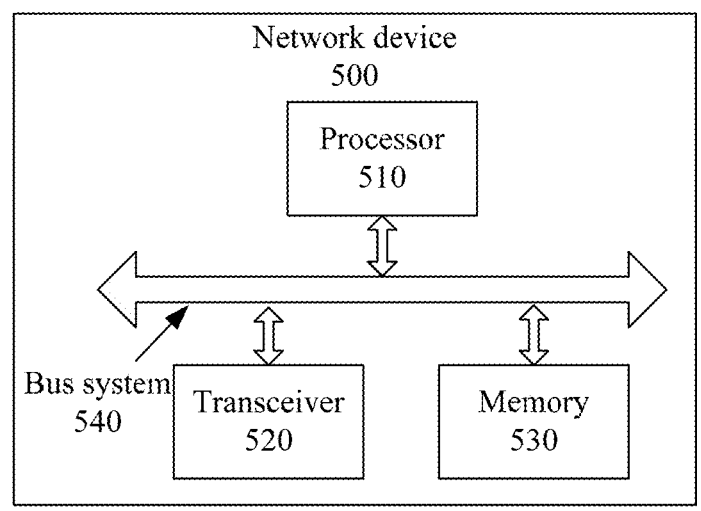
FIG. 11 is a schematic block diagram of a network device according to another embodiment of the disclosure.

FIG. 11 is a schematic block diagram of a network device 500 according to an embodiment of the disclosure. As illustrated in FIG. 11, the network device 500 includes: a processor 510 and a transceiver 520. The processor 510 is connected with the transceiver 520. Optionally, the network device 500 further includes a memory 530. The memory 530 is connected with the processor 510. Furthermore, the network device 500 optionally includes a bus system 540. The processor 510, the memory 530 and the transceiver 520 may be connected through the bus system 540. The memory 530 may be configured to store an instruction. The processor 510 is configured to execute the instruction stored in the memory 530 to control the transceiver 520 to send information or a signal.

The processor 510 is configured to generate beam-specific information corresponding to each of multiple beams, here, first beam-specific information of a first beam of the multiple beams is used to indicate a configuration parameter of the first beam and the configuration parameter of the first beam is used for a terminal device in coverage of the first beam to determine system information of the first beam.

The transceiver 520 is configured to send corresponding beam-specific information to terminal devices in the same cell through each beam.

In such a manner, according to the embodiment of the disclosure, the network device sends downlink signals to multiple terminal devices in the same cell through the multiple beams, and for the terminal device in each beam, the network device contains a configuration parameter of the beam in the beam-specific information to enable the terminal device in coverage of the beam to acquire system information of the beam according to the configuration parameter of the beam. Adoption of different configurations for different beams may be supported. Therefore, beam transmission flexibility is improved, and system transmission efficiency is improved.

Optionally, the first beam-specific information includes a time-domain offset field and the time-domain offset field is used to indicate a time-domain offset between a first synchronization signal sent through the first beam and frame timing of the cell.

Optionally, the first beam-specific information includes a system bandwidth indication field and the system bandwidth indication field is used to indicate a total bandwidth occupied by a signal sent through the first beam and a frequency-domain offset between a central frequency point of the total bandwidth and a central frequency point of the cell.

Optionally, the first beam-specific information includes a control channel time-frequency region indication field and the control channel time-frequency region indication field is used to indicate a size of a time-frequency region of a first control channel sent to at least one terminal device through the first beam.

Optionally, the first control channel includes a common search space and a UE-specific search space, the common search space is configured to bear common information of the first beam, the UE-specific search space is configured to bear specific information of each of at least one terminal device in the coverage of the first beam and each terminal device communicates with the network device through the first beam.

Optionally, the processor 510 is configured to allocate different UE-specific codes for different terminal devices in the at least one terminal device, here, a first terminal device of the at least one terminal device corresponds to a first UE-specific code; and scramble first control signaling corresponding to the first terminal device in the first control channel according to the first UE-specific code.

Optionally, the processor 510 is configured to determine, by the network device, a location and size of a UE-specific search space corresponding to the first terminal device in the first control channel according to a size of the first control channel and the first UE-specific code.

It is to be understood that the network device 500 according to the embodiment of the disclosure may correspond to the network device 300 in the embodiment of the disclosure and may correspond to a corresponding body executing the method 100 according to the embodiment of the disclosure and the abovementioned and other operations and/or functions of each module in the network device 500 are adopted to implement the corresponding flows of each method in FIG. 1 to FIG. 7 respectively and will not be elaborated herein for simplicity.

In such a manner, according to the embodiment of the disclosure, the network device sends the downlink signals to the multiple terminal devices in the same cell through the multiple cells, and for the terminal device in each beam, the network device contains the configuration parameter of the beam in the beam-specific information sent to the terminal device to enable the terminal device in the coverage of the beam to acquire the system information of the beam according to the configuration parameter of the beam. Therefore, the situation in the related art that a beam may only send unified cell-specific information is avoided, different beams may send different information, the configuration parameter of each beam may be independently configured, thus system flexibility is improved, and system transmission efficiency may also be improved.

Figure 12:
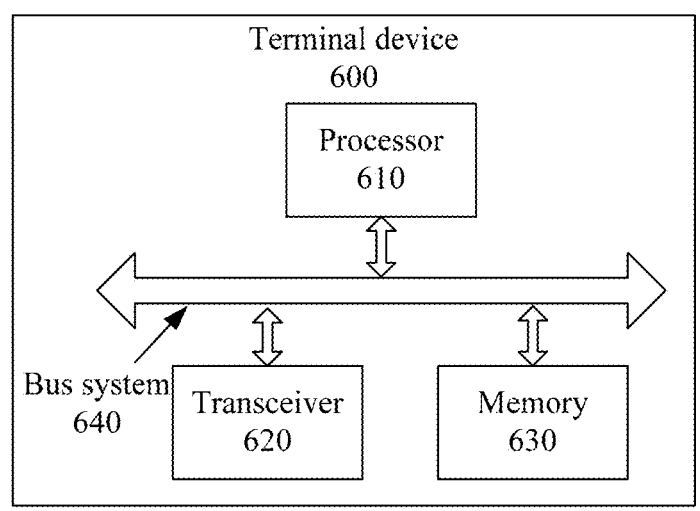
FIG. 12 is a schematic block diagram of a terminal device according to another embodiment of the disclosure.

FIG. 12 is a schematic block diagram of a terminal device 600 according to an embodiment of the disclosure. As illustrated in FIG. 12, the terminal device 600 includes: a processor 610 and a transceiver 620. The processor 610 is connected with the transceiver 620. Optionally, the terminal device 600 further includes a memory 630. The memory 630 is connected with the processor 610. Furthermore, the terminal device 600 optionally includes a bus system 640. The processor 610, the memory 630 and the transceiver 620 may be connected through the bus system 640, the memory 630 may be configured to store an instruction, and the processor 610 is configured to execute the instruction stored in the memory 630 to control the transceiver 620 to send information or a signal.

The transceiver 620 is configured to receive first beam-specific information sent by a network device, here, the first beam-specific information is used to indicate a configuration parameter of a first beam of multiple beams, the network device is configured to send corresponding beam-specific information to terminal devices in the same cell through each of the multiple beams and the terminal device is located in coverage of the first beam.

The processor 610 is configured to determine system information of the first beam according to the first beam-specific information.

In such a manner, according to the embodiment of the disclosure, the terminal device may acquire the system information of the corresponding beam according to the configuration parameter of the beam in the beam-specific information received from the network device, and the network device may send downlink signals to multiple terminal devices in the same cell through multiple beams. Adoption of different configurations for different beams may be supported. Therefore, beam transmission flexibility is improved, system transmission efficiency is improved and resource waste is avoided.

Optionally, the first beam-specific information includes a time-domain offset field, and the processor 610 is configured to determine, according to the time-domain offset field, a time-domain offset between a first synchronization signal received through the first beam and frame timing of the cell.

Optionally, the first beam-specific information includes a system bandwidth indication field, and the processor 610 is configured to determine, according to the system bandwidth indication field, a total bandwidth occupied by a signal received through the first beam and a frequency-domain offset between a central frequency point of the total bandwidth and a central frequency point of the cell.

Optionally, the first beam-specific information includes a control channel time-frequency region indication field, and the processor 610 is configured to determine, according to the control channel time-frequency region indication field, a size of a time-frequency region of a first control channel received through the first beam.

Optionally, the first control channel includes a common search space and a UE-specific search space, and the processor 610 is configured to determine common information of the first beam according to the common search space and determine specific information of the terminal device according to the UE-specific search space.

Optionally, different terminal devices in the coverage of the first beam have different UE-specific codes, the terminal device corresponds to a first UE-specific code, and the processor 610 is configured to descramble first control signaling corresponding to the terminal device in the first control channel according to the first UE-specific code.

Optionally, the processor 610 is configured to determine a location and size of a UE-specific search space corresponding to the terminal device in the first control channel according to a size of the first control channel and the first UE-specific code.

It is to be understood that the terminal device 600 according to the embodiment of the disclosure may correspond to the terminal device 400 in the embodiment of the disclosure and may correspond to a corresponding body executing the method 200 according to the embodiment of the disclosure and the abovementioned and other operations and/or functions of each module in the terminal device 600 are adopted to implement the corresponding flows of each method in FIG. 8 respectively and will not be elaborated herein for simplicity.

In such a manner, according to the embodiment of the disclosure, the terminal device receives the beam-specific information sent by the network device, the network device may send the downlink signals to the multiple terminal devices in the same cell through the multiple cells, and the terminal device acquires the system information of the corresponding beam according to the configuration parameter of the beam in the beam-specific information. Therefore, the situation in the related art that a beam may only send unified cell-specific information is avoided, different beams may send different information, the configuration parameter of each beam may be independently configured, thus system flexibility is improved, and system transmission efficiency may also be improved.

Additional Embodiments

At least some embodiments of the disclosure provide a method for signal transmission, a network device and a terminal device, which may extend system coverage, reduce an overhead, improve system flexibility and improve transmission efficiency.

The at least some embodiments of the disclosure provide a method for signal transmission, which may include that: a network device generates beam-specific information corresponding to each of multiple beams, herein, first beam-specific information of a first beam of the multiple beams is used to indicate a configuration parameter of the first beam and the configuration parameter of the first beam is used for a terminal device in coverage of the first beam to determine system information of the first beam; and the network device sends corresponding beam-specific information to terminal devices in the same cell through each beam.

In such a manner, according to the method for signal transmission of the disclosure, downlink signals are sent to multiple terminal devices in the same cell through the multiple beams, and for the terminal device in each beam, the network device carries a configuration parameter of the beam in beam-specific information to enable the terminal device in coverage of the beam to acquire system information of the beam according to the configuration parameter of the beam. Adoption of different configurations for different beams may be supported. Therefore, beam transmission flexibility is improved, and system transmission efficiency is improved.

According to the at least some embodiments, the first beam-specific information may include a time-domain offset field and the time-domain offset field may be used to indicate a time-domain offset between a first synchronization signal sent through the first beam and frame timing of the cell.

According to the at least some embodiments, the time-domain offset field may directly indicate the time-domain offset.

According to the at least some embodiments, the time-domain offset field may also indirectly indicate the time-domain offset and is represented by a sequence number of the beam or a sequence number of a time-domain location where a synchronization signal is sent by the beam. The time-domain offset is determined according to a corresponding relationship of the sequence number of the beam, the sequence number of the time-domain location where the synchronization signal is sent and the time-domain offset.

Therefore, synchronization signals are sent by different beams at different locations and then the terminal device in the coverage of each beam may determine the time-domain location where the synchronization signal is sent by the beam, according to the time-domain offset field in the corresponding beam-specific information and further determine the frame timing of the cell.

According to the at least some embodiments, the first beam-specific information may include a system bandwidth indication field and the system bandwidth indication field may be used to indicate a total bandwidth occupied by a signal sent through the first beam and a frequency-domain offset between a central frequency point of the total bandwidth and a central frequency point of the cell.

According to the at least some embodiments, the cell of the network device may include the multiple beams and a bandwidth of each beam may be different.

In such a manner, a total bandwidth occupied by the signal sent by each beam may be set according to the number of devices in the beam, and the total bandwidth and location of the beam are indicated by a system bandwidth indication field in the beam-specific information, so that a beam may only occupy a part of bandwidth to transmit the signal, for example, data and control signaling, and time-frequency resources are saved. Moreover, adjacent beams may occupy different time-frequency resources to transmit the data and the control signaling, so that reduction in interference between the data and control signaling of different beams is facilitated.

According to the at least some embodiments, the first beam-specific information may include a control channel time-frequency region indication field and the control channel time-frequency region indication field may be used to indicate a size of a time-frequency region of a first control channel sent to at least one terminal device through the first beam.

Since there may be different numbers of terminal devices in coverage of different beams, control channel capacities required for the different beams may also be set to be different.

In such a manner, a size of a time-frequency region of a control channel sent by each beam is indicated by a control channel time-frequency region indication field in the beam-specific information of the beam, and then the beam may be supported to flexibly regulate a capacity of the control channel according to the number of the terminal devices. Therefore, a control channel overhead is saved and a spectrum utilization rate is increased.

According to the at least some embodiments, the first control channel may include a common search space and a UE-specific search space, the common search space may be used to bear common information of the first beam, the UE-specific search space may be used to bear specific information of each of at least one terminal device in the coverage of the first beam and each terminal device may communicate with the network device through the first beam.

In such a manner, search spaces are divided for each beam and the search spaces are divided for different terminal devices covered by different beams. Therefore, sizes of the search spaces may be reduced and blind detection complexity of a terminal may be reduced.

According to the at least some embodiments, the method may further include that: the network device allocates different UE-specific codes for different terminal devices of the at least one terminal device, here, a first terminal device of the at least one terminal device corresponds to a first UE-specific code; and the network device scrambles first control signaling corresponding to the first terminal device in the first control channel according to the first UE-specific code.

In such a manner, the UE-specific codes may be allocated for the terminal devices in each beam and the UE-specific codes may be multiplexed between different beams. Therefore, the number of required codes may be greatly reduced, code resources may be saved, a length of a scrambling code may also be reduced and scrambling and descrambling complexity is reduced.

According to the at least some embodiments, the method may further include that: the network device determines a location and size of a UE-specific search space corresponding to the first terminal device in the first control channel according to a size of the first control channel and the first UE-specific code.

According to the at least some embodiments, a resource unit with a fixed size may be set, and the network device determines the location of the UE-specific search space corresponding to the first terminal device according to the size of the first control channel and the first UE-specific code and may further determine the total size of the UE-specific search space corresponding to the first terminal device.

According to the at least some embodiments, the resource unit with the fixed size may also not be set, and the location and size of the UE-specific search space corresponding to the first terminal device in the first control channel are determined according to the size of the first control channel and the first UE-specific code.

The at least some embodiments of the disclosure provide a method for signal transmission, which may include that: a first terminal device receives first beam-specific information, here, the first beam-specific information is used to indicate a configuration parameter of a first beam of multiple beams, each of the multiple beams is used to send corresponding beam-specific information to terminal devices in the same cell and the first terminal device is located in coverage of the first beam; and the first terminal device determines system information of the first beam according to the first beam-specific information.

In such a manner, according to the method for signal transmission of the disclosure, the network device sends downlink signals to multiple terminal devices in the same cell through the multiple beams, and the terminal device in each beam may acquire system information of the beam according to a configuration parameter of the beam in the beam-specific information received from the network device. Adoption of different configurations for different beams may be supported. Therefore, beam transmission flexibility is improved, system transmission efficiency is improved and resource waste is avoided.

According to the at least some embodiments, the first beam-specific information may include a time-domain offset field, and the operation that the first terminal device determines the system information of the first beam according to the first beam-specific information may include that: the first terminal device determines a time-domain offset between a first synchronization signal received through the first beam and frame timing of the cell according to the first beam-specific information.

According to the at least some embodiments, the first beam-specific information may include a system bandwidth indication field, and the operation that the first terminal device determines the system information of the first beam according to the first beam-specific information may include that: the first terminal device determines, according to the first beam-specific information, a total bandwidth occupied by a signal received through the first beam and a frequency-domain offset between a central frequency point of the total bandwidth and a central frequency point of the cell.

According to the at least some embodiments, the first beam-specific information may include a control channel time-frequency region indication field, and the operation that the first terminal device determines the system information of the first beam according to the first beam-specific information may include that: the first terminal device determines, according to the control channel time-frequency region indication field, a size of a time-frequency region of a first control channel received through the first beam.

According to the at least some embodiments, the first control channel may include a common search space and a UE-specific search space, and the method may further include that: the first terminal device determines common information of the first beam according to the common search space; and the first terminal device determines specific information of the first terminal device according to the UE-specific search space.

According to the at least some embodiments, different terminal devices in the coverage of the first beam may have different UE-specific codes, the first terminal device may correspond to a first UE-specific code, and the method may further include that: the first terminal device descrambles first control signaling corresponding to the first terminal device in the first control channel according to the first UE-specific code.

According to the at least some embodiments, the method may further include that: the first terminal device determines a location and size of a UE-specific search space corresponding to the first terminal device in the first control channel according to a size of the first control channel and the first UE-specific code.

The at least some embodiments of the disclosure provide a network device. Specifically, the network device includes units configured to execute the method for signal transmission which is performed by the network device in the foregoing embodiments.

The at least some embodiments of the disclosure provide a terminal device. Specifically, the terminal device includes units configured to execute the method for signal transmission which is performed by the terminal device in the foregoing embodiments.

The at least some embodiments of the disclosure provide a network device, which includes a processor, a memory and a transceiver. The memory is configured to store instructions. The processor is configured to corporate with the transceiver to perform the method for signal transmission which is performed by the network device in the foregoing embodiments.

The at least some embodiments of the disclosure provide a terminal device, which includes a processor, a memory and a processor. The memory is configured to store instructions. The processor is configured to corporate with the transceiver to perform the method for signal transmission which is performed by the terminal device in the foregoing embodiments.

The at least some embodiments of the disclosure provide a non-transitory computer-readable medium, which is configured to store a computer program. The computer program includes an instruction configured to execute the method for signal transmission which is performed by the network device in the foregoing embodiments.

The at least some embodiments of the disclosure provide a non-transitory computer-readable medium, which is configured to store a computer program. The computer program includes an instruction configured to execute the method for signal transmission which is performed by the terminal device in the foregoing embodiments.

It is to be noted that the method embodiments of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in the art such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Electrically PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but is not limited to, memories of these and any other proper types.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes various media capable of storing program codes such as a U disk, a mobile hard disk, a ROM, a RAM, a magnetic disk or an optical disk.

The above is only the specific implementation mode of the disclosure and is not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining frame timing, comprising:
receiving, by a terminal device, beam-specific information through a beam, the beam-specific information comprising a control channel time-frequency region indication field, the control channel time-frequency region indication field being used to indicate a size of a time-frequency region of a control channel sent through the beam; and
determining, by the terminal device, the size of the time-frequency region of the control channel according to the control channel time-frequency region indication field.

2. The method of claim 1, wherein the beam-specific information further comprises a system bandwidth indication field, and
the method further comprises:
determining, by the terminal device, according to the system bandwidth indication field, a total bandwidth occupied by a signal received through the beam and a frequency-domain offset between a central frequency point of the total bandwidth and a central frequency point of a cell.

3. The method of claim 1, wherein the beam is a beam of a plurality of beams in a cell where the terminal device is, and synchronization signals sent through different beams have different time-frequency offsets relative to the frame timing.

4. The method of claim 1, wherein the receiving, by the terminal device, the beam-specific information through the beam comprises:
searching, by the terminal device, a search region belonging to the terminal device to acquire the beam-specific information.

5. A method for determining frame timing, comprising:
determining, by a network device, a time-domain location where a synchronization signal is sent through a beam of a plurality of beams; and
sending, by the network device, the synchronization signal and beam-specific information to a terminal device, wherein the beam-specific information comprises a control channel time-frequency region indication field, the control channel time-frequency region indication field is used to indicate a size of a time-frequency region of a control channel sent through the beam.

6. The method of claim 5, wherein the beam-specific information further comprises a system bandwidth indication field, and the system bandwidth indication field is used to instruct the terminal device to determine, according to the system bandwidth indication field, a total bandwidth occupied by a signal received through the beam and a frequency-domain offset between a central frequency point of the total bandwidth and a central frequency point of a cell.

7. The method of claim 5, wherein synchronization signals sent through different beams have different time-frequency offsets relative to the frame timing.

8. A terminal device, comprising:
a processor; and
a transceiver coupled with the processor,
wherein the processor is configured to receive, through the transceiver, beam-specific information through a beam, the beam-specific information comprising a control channel time-frequency region indication field, the control channel time-frequency region indication field being used to indicate a size of a time-frequency region of a control channel sent through the beam; and
determine the size of the time-frequency region of the control channel according to the control channel time-frequency region indication field.

9. The terminal device of claim 8, wherein the beam-specific information further comprises a system bandwidth indication field, and
the processor is configured to:
determine, according to the system bandwidth indication field, a total bandwidth occupied by a signal received through the beam and a frequency-domain offset between a central frequency point of the total bandwidth and a central frequency point of a cell.

10. The terminal device of claim 8, wherein the beam is a beam of a plurality of beams in a cell where the terminal device is, and synchronization signals sent through different beams have different time-frequency offsets relative to the frame timing.

11. The terminal device of claim 8, wherein the processor is configured to search a search region belonging to the terminal device to acquire, through the transceiver, the beam specific information.

12. A network device, comprising:
a processor;
a transceiver coupled with the processor,
wherein the processor is configured to determine a time-domain location where a synchronization signal is sent through a beam of a plurality of beams; and
send, through the transceiver, the synchronization signal and beam-specific information to a terminal device, wherein the beam-specific information comprises a control channel time-frequency region indication field, the control channel time-frequency region indication field is used to indicate a size of a time-frequency region of a control channel sent through the beam.

13. The network device of claim 12, wherein the beam-specific information further comprises a system bandwidth indication field, and the system bandwidth indication field is used to instruct the terminal device to determine, according to the system bandwidth indication field, a total bandwidth occupied by a signal received through the beam and a frequency-domain offset between a central frequency point of the total bandwidth and a central frequency point of a cell.

14. The network device of claim 12, wherein synchronization signals sent through different beams have different time-frequency offsets relative to the frame timing.

\* \* \* \* \*